United States Patent [19]

Komura et al.

[11] Patent Number: 5,622,358

[45] Date of Patent: Apr. 22, 1997

[54] WAVE SPRING

[75] Inventors: Syoichi Komura; Hiroyuki Toyofuku, both of Kyoto, Japan

[73] Assignee: Suncall Corporation, Kyoto-fu, Japan

[21] Appl. No.: 214,573

[22] Filed: Mar. 18, 1994

[30] Foreign Application Priority Data

Mar. 29, 1993 [JP] Japan ................................ 5-070347

[51] Int. Cl.$^6$ .................................................. F16F 1/10
[52] U.S. Cl. ............................................................ 267/166
[58] Field of Search ................................... 267/155, 156, 267/157, 166, 167, 180, 182

[56] References Cited

U.S. PATENT DOCUMENTS 4,901,987  2/1990  Greenhill et al. ...................... 267/166
4,957,278  9/1990  Komura et al. ........................ 267/166

*Primary Examiner*—Robert J. Oberleitner
*Assistant Examiner*—Chris Schwartz
*Attorney, Agent, or Firm*—Nikaido Marmelstein Murray & Oram LLP

[57]  ABSTRACT

A wave spring (10) is formed in which linear relation is retained between a load (P) and a deflection (S). Thereby, the degree of freedom of design of springs is enhanced.

In forming a spring structure by coiling a spring material having flat cross section, a clothoid curve is selectively used as a shape-determining factor for the spring structure.

2 Claims, 5 Drawing Sheets

TMS.

MODIFIED TRAPEZOIDAL CURVE

WAVE SPRING

BACKGROUND OF THE INVENTION

The present invention relates to improvements in a wave spring and particularly to improvements in a wave spring or imparting a linear weight versus deflection characteristic to a wave spring component.

A wave spring formed by winding a steel band having a flat cross section into a coil to serve as a spring structure is known. As shown in FIG. 10, a wave spring 1 has predetermined numbers of ridges 2 and troughs 3 per turn circumferentially disposed at a predetermined pitch such that the upper end of a ridge in one coil layer is opposed to the lower end of said trough in an adjacent coil layer thus forming a spring structure.

The coil shape of the said wave spring 1 is selected such that the magnitude of a deflection S produced when the wave spring 1 is subjected to an axial compression load P lies in a predetermined region of elastic deformation of the spring material, e.g. steel. For example, in the case where said wave spring is used in a clutch device of a speed changer for automobiles, it is desirable that a linear or substantially linear deformation characteristic be maintained between the load P imposed on the wave spring 1 by depressing the clutch pedal and the deflection S produced by said load, at least in its effective operation region.

FIG. 11 is a load versus deflection diagram for explaining by way of example said deformation characteristic. In the initial region I where the compression load P is started to be applied to the wave spring, the load versus deflection characteristic is unstable since the ridges 2 and the troughs 3 in the upper stage contact each other or since the clearance between the ridge 2 and the trough 3 of the wave spring varies in size. In contrast, in the terminal load region III, the ridges 2 and troughs 3 of the wave spring approach the closely contacted state, whereby the load P sharply increases with little change in deflection. Actually, the wave spring 1 functions as a spring structure in which the relation between the load P and the deflection S is maintained nearly linear only in the intermediate region II which is the effective operation region of the spring.

In this connection, heretofore used as a factor which determines the coil shape of the wave spring 1 is a deformation sine curve (TMS), shown in FIG. 13 (A) or a deformation trapezoid curve shown in FIG. 13 (B).

FIG. 12 is a perspective view showing a deflection measuring instrument 6 prepared fox measuring the elastic characteristics of the wave spring 1, with the wave spring 1 placed thereon. A wave spring, for example, the wave spring 1 whose coil shape is determined by the deformation sine curve (TMS), is seated on the deflection measuring instrument 6 and the deflection H produced by a distributed compression load P is measured. The deflection measuring instrument 6 is a spring structure support block comprising a pair of spring support flanges 4 disposed on opposite sides radially extending from a center point O, and a spring support surface 5 in the form of a sectorial planar plate which is connected to the inner lateral surfaces of the support flanges 4. In use, the wave spring 1 is positioned with its opposite ends abutting against the inner lateral surfaces of the support flanges 4 and a distributed compression load P is imposed on the center of the ridge 2 to measure the elastic deformation S produced in the wave spring 1.

The wave spring 1 experiences a decrease in the height H of the ridge 2 above the spring support surface 5 with the imposition of the distributed compression load P, and simultaneously therewith, the ends of the troughs 3 are slid along the inner lateral surfaces of the spring support flanges 4, resulting in a radially outwardly directed (indicated by the reference character R) diameter increasing movement. By measuring the amount of sink, i.e., elastic deformation H, of the ridge 2 while progressively increasing the distributed compression load P, a load versus deflection curve as shown in FIG. 11 is obtained.

As will be understood from the above description, if the coil shape of the wave spring 1 is designed to be a modified sine curve or modified trapezoid, the load versus deflection curve will be appreciably nonlinear even in the intermediate region II which is designed to be the effective operating region, as shown in FIG. 11. In the case where deflection v. load linearity is not retained in such linear load versus deflection characteristic, the width of selection of spring characteristics is narrowed, presenting such problems as an increase in the number of design steps and an increase in the characteristic testing period. As a result, deflection v. load linearity is no longer retained between load and deflection as in the clutch of an automobile speed changer having the wave spring 1 incorporated therein and, furthermore, the number of design steps is increased by repetition of trial making of wave springs; thus, the manufacturing cost of wave springs increases greatly.

SUMMARY OF THE INVENTION

As a means for solving the above problems, the present invention provides a wave spring formed by coiling a spring material of flat cross section, said wave spring being characterized in that said spring material which circumferentially extends has a shape represented by a clothoid curve and in that linearity is retained in the relation between a load imposed on said wave spring and a deflection produced thereby, and also provides a wave spring characterized in that the curved portion of said wave spring coiled in clothoid form is formed with a parallel portion in flat developed form, said parallel portion being tangentially connected to the terminal end of said clothoid curve.

In forming a spring structure by coiling a spring material of flat cross section, said circumferentially extending spring material is given a shape represented by a clothoid curve. Since such clothoid curve has a characteristic in which the radius of curvature continuously varies in inverse proportion to the length of the curve, linearity can be retained in the relation between load P and deflection S easily as compared with the modified sine curve or modified trapezoidal curve in which no continuity is seen in changes in radius of curvature.

As a result, buckling ascribable to the nonlinearity of changes in radius of curvature is substantially avoided.

BRIEF DESCRIPTION OF THE DRAWINGS

FIG. 13 (B) is a partial view of a prior art wave spring formed from a modified trapezoidal curve.

DESCRIPTION OF THE PREFERRED EMBODIMENTS

A concrete example of the present invention will now be describe using a comparative example with reference to FIGS. 1 through 9.

As will be understood from the theory of simple beams, the radius of curvature p upon imposition of a bending moment M of a flat wave spring is represented as a function of modulus of longitudinal elasticity E and second moment of area I, as indicated by the formula (1).

$$\frac{1}{\rho} = \frac{M}{EI} \quad (1)$$

That is, when the bending moment M is imposed on the wave spring, provided that the modulus of longitudinal elasticity E and second moment of area I are constant, the bending moment M changes in proportion of the inverse of the radius of curvature, $1/\rho$, of the wave spring.

A wave spring 10 (so called if there is only one coil layer) can be treated as a simple beam from dynamic point of view. Therefore, when a distributed compression load P corresponding to said bending moment M is imposed on the pressure receiving surface, in order to establish an inversely proportional relation between the magnitude of the distributed compression load P and the inverse of radius of curvature, $1/\rho$, it is necessary to select a coil shape curve such that the radius of curvature $\rho$ continuously changes as the distributed compression load P increases.

In consideration of the above fact, as means for establishing a proportional relation between the distributed compression load P and the inverse of radius of curvature, $1/\rho$, a clothoid curve has been selected.

Figure 1:
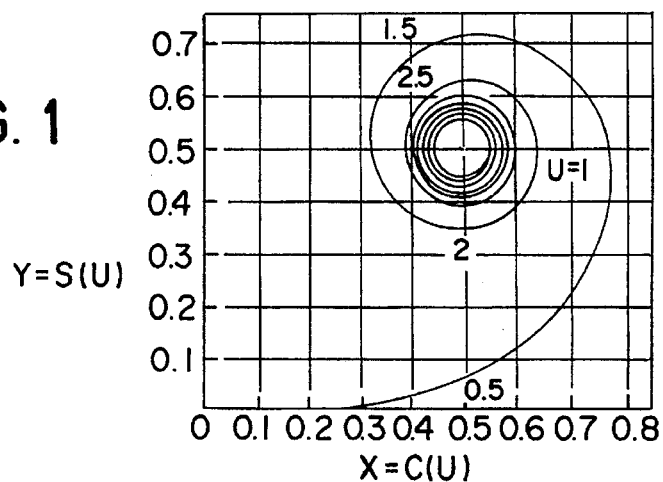
FIG. 1 is a theoretical explanatory view of a clothoid curve.
Figure 2:
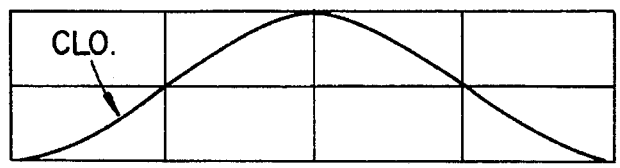
FIG. 2 is a front view of a wave spring having formed therein a minimum unit of ridge and trough in a clothoid curve.

That is, a clothoid curve CLO, as shown in FIGS. 1 and 2, is a curve whose radius of curvature $\rho$ continuously changes in inverse proportion to the length of the curve CLO and mathematically it can be defined using the curve length u as a parameter, as indicated by the formula (2).

$$x = a \cdot c(u) = a \int_0^u \cos\pi u^2/2 \, du$$

$$y = a \cdot s(u) = a \int_0^u \sin\pi u^2/2 \, du$$

where u is the length of the curve and a is a proportionality constant. The tangent direction $\phi$ and the radius of curvature $\rho$ at any point on the clothoid curve are respectively defined by the formulas (3) and (4).

$$\phi = \frac{\pi u^2}{2} \quad (3)$$

$$\rho = \pm \frac{a}{\pi u} \quad (4)$$

The functions x and y are difficult to treat as elementary functions, but the direction $\phi$ of a tangent can be calculated as functions of the length U.

Referring to FIGS. 3 through 6, the formation of the wave spring 10 using a clothoid curve will now be described by way of its concrete examples.

Figure 3:
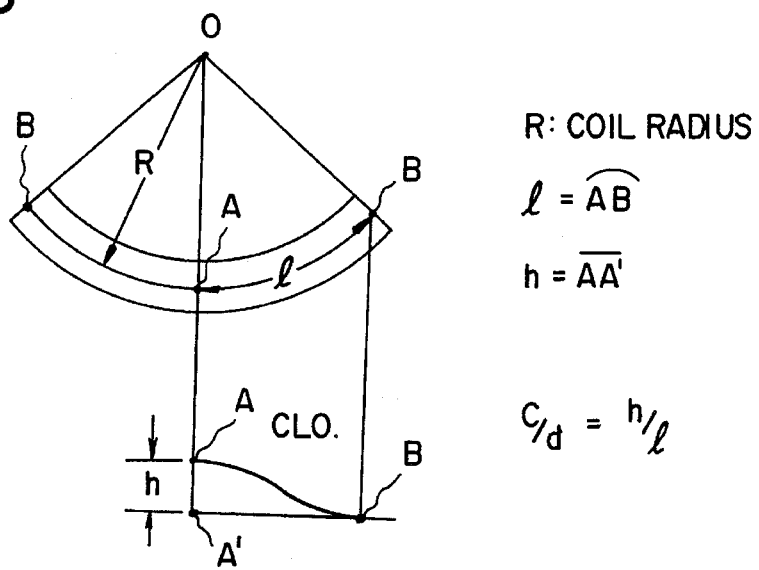
FIG. 3 is a view for explaining the order of making of the wave spring.
Figure 4:
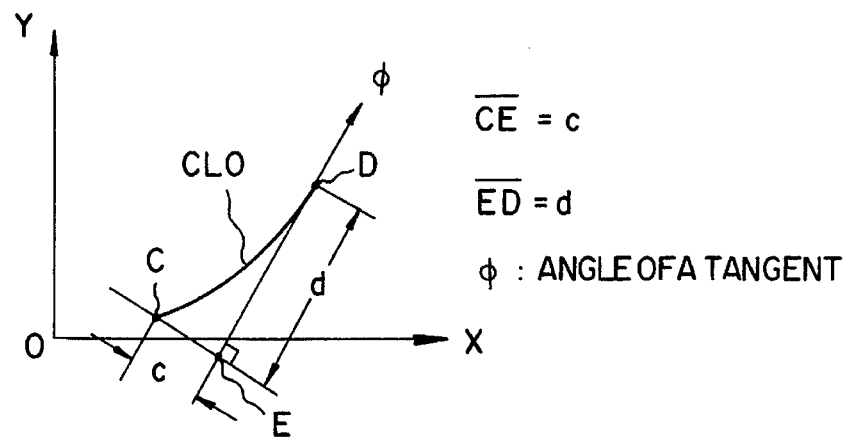
FIG. 4 is a view for explaining the order of making of the wave spring.

First, as shown in FIG. 3, the distance from the coil center O to the widthwise center of the wave spring 10, i.e., the length of half the ridge measured at the coil radius R (l=AB) and the height (h=AA') of the ridge are measured and an arc CD is cut out of a clothoid curve CLO. In cutting the arc CD, the cutting conditions are set such that in FIGS. 3 and 4, the condition that c/d=h/l is satisfied. In this connection, the segments CE and ED in FIG. 4 are determined such that the conditions that CD=c and ED=α are satisfied. In addition, $\phi$ indicates the angle of a tangent to the clothoid curve CLO at a point D.

Figure 5:
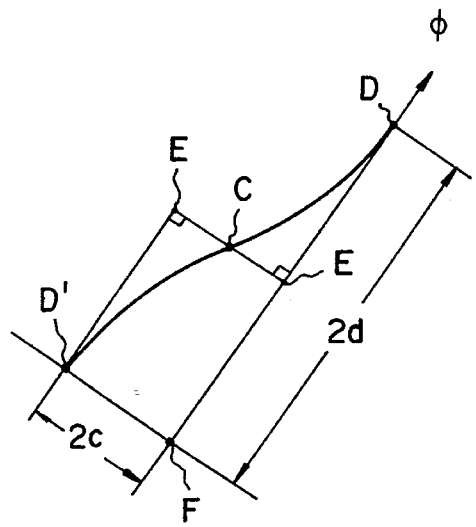
FIG. 5 is a view for explaining the order of making of the wave spring.

As shown in FIG. 5, the are CD cut out in FIG. 3 is turned through 180 degrees around a point C for point-symmetrical development so as to form an are CD'. From the length of the arc CD', which is 2α, as measured on the axis DF (center axis) and the height of the are DD', which is 2C, as measured on the axis D'F which is orthogonal to said axis $\phi$, a constant a is found such that the conditions that h=ac and l'=ad are satisfied, thereby forming the intended clothoid curve CLO.

Figure 6:
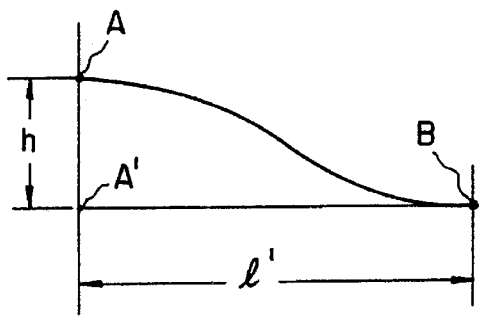
FIG. 6 is a view fox explaining the order of making of the wave spring.

Finally, coordinate transformation is made such that the tangent angle $\phi$ to in FIG. 5 is 0°. Then, the length of half the ridge (l'=AB) and the ridge height (h=AA') shown in FIG. 6 are determined. As a result, a clothoid curve CLO is formed such that the point B in FIG. 6 coincides with the point D in FIG. 5 and the point A in FIG. 6 coincides with the point D' in FIG. 5.

The resulting clothoid curve is used as the minimum unit of coil and a plurality of such clothoid curves are connected together to provide a wave spring 10 such that the waveform seen in the direction orthogonal to the coil axis O—O' is formed from a continuous body of clothoid curves.

Figure 7:
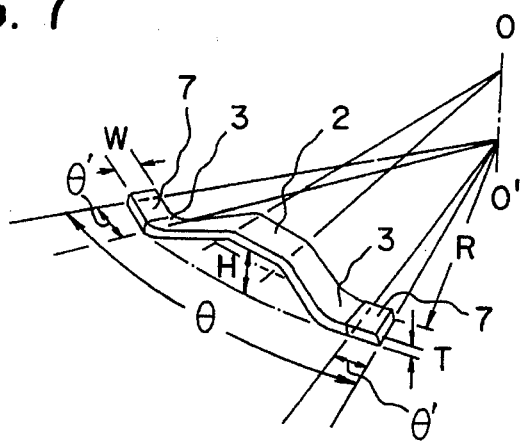
FIG. 7 is a perspective view for explaining the shape characteristic of the wave spring.

The concrete example described above refers to the formation of the wave spring 10, which is formed only of the ridge 2 and troughs 3. However, as a modification, in the case where it is necessary to provide parallel portions 7 at the opposed ends of the troughs 3 as shown in FIG. 7 and table 1, such parallel portion 7 is connected to the terminal end of the clothoid curve portion 3 (the point B in FIG. 3) such that the parallel portion 7 forms a tangent $\phi$ to said terminal end.

TABLE 1

(A)

| | |
|---|---|
| Thickness of steel band (T) | 1.2 mm |
| Width of steel band (W) | 5.5 mm |
| Coil radius of steel band (R) | 39.75 mm |
| Height of wave (H) | 1.5 mm |
| Number of ridges per turn of coil | 5.5 ridges per turn |
| Angle per ridge (θ) | 32.73 × 2° |

(B)

| | | without parallel portion (–NF) | with parallel portion (–F) |
|---|---|---|---|
| Clothoid curve (CLO) | | 45.53 mm | 50.10 mm |
| Modified sine curve (TMS) | | 44.28 mm | 48.61 mm |
| Size of Parallel portion | Circumferential length | 0 | 4.54 mm |
| | Angle | 0° | 6.55° |

(A) is a table showing the dimensions of a trial wave spring formed from a clothoid curve.

(B) is a table showing the dimensions of two trial wave springs formed of a clothoid curve and a modified sine curve.

Figure 8:
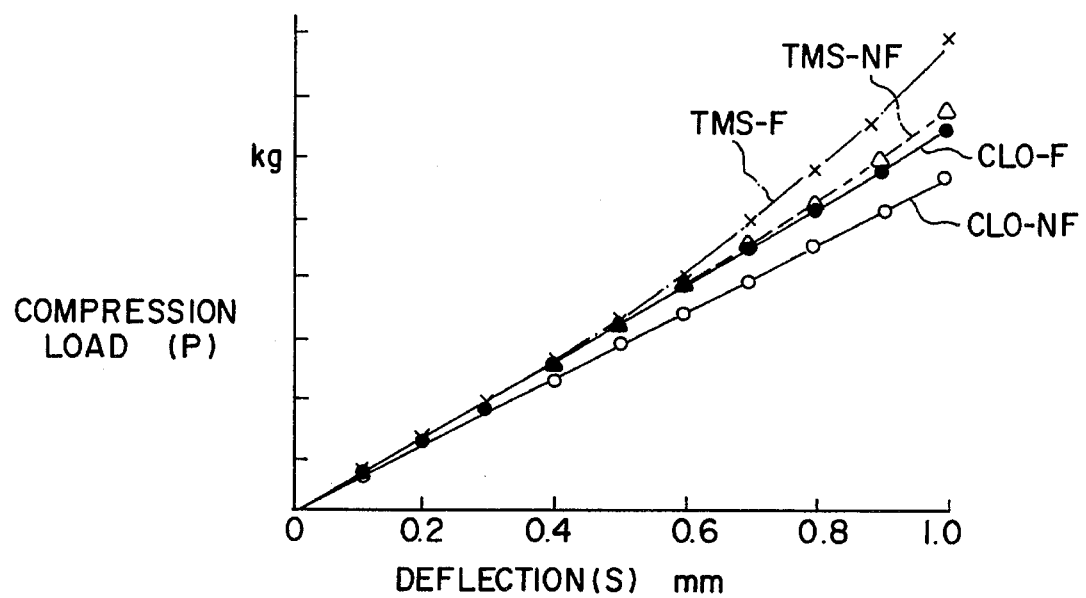
FIG. 8 is a load versus deflection curve of a wave spring.
Figure 9:
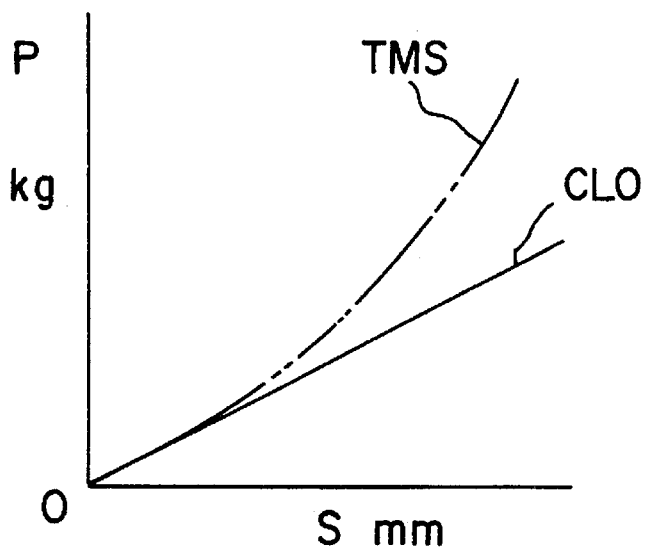
FIG. 9 is a load versus deflection curve of a wave spring.
Figure 10:
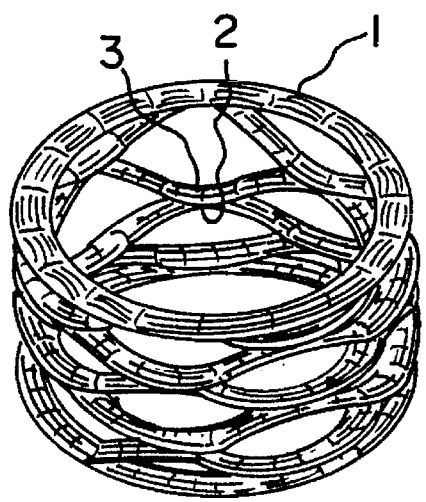
FIG. 10 is a perspective view of a prior art wave spring having a wave portion formed on a deformed trapezoid curve basis however the wave spring of the instant invention resembles this spring in appearance only; the difference being in that the shape of the ridge and root sections have the shape of a clothoid curve, not visually distinguishable in the drawing.
Figure 11:
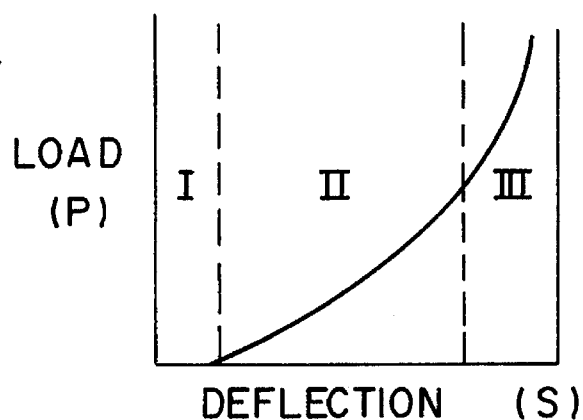
FIG. 11 is a load versus deflection curve in the initial, intermediate and terminal regions of a prior art spring.
Figure 12:
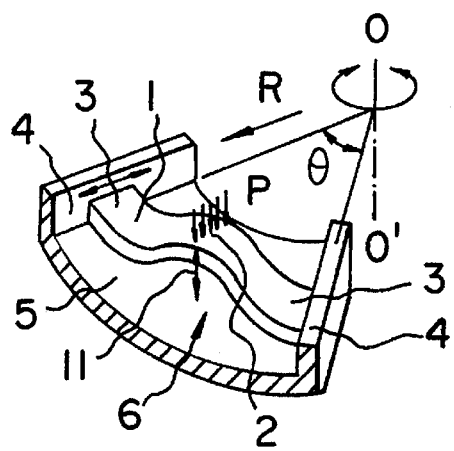
FIG. 12 is a loading view of a prior art wave spring placed on a deflection measuring instrument.

To facilitate the understanding of the present invention, wave spring samples having the dimensions shown in FIG. 7 and Table 1 (A) and (B) and formed from a clothoid curve CLO were prepared and a distributed compression load P was imposed thereon to measure the relation between load P and deflection (S) in the same manner as in FIG. 12. As for the wave spring samples 10, there were prepared two types, one (CLO-F) having a ridge 2 and parallel portions 7 connected to the opposed ends of troughs 3 and the other (CLO-NF) having no parallel portions. Prepared as comparative examples were a wave spring sample (TMS-NF) formed solely of a modified sine curve and a wave spring sample (TMS-F) having parallel portions 7 connected to the opposite ends of a modified sine curve portion, as shown in Table 1, and the relation between load P and deflection S was measured in the same manner as described above. The respective results are shown in FIG. 8. FIG. 9 is a conceptional load versus deflection curve for clarifying the physical meaning for FIG. 8.

Figure 13A:
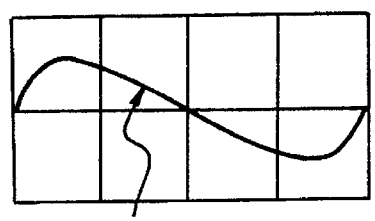
FIG. 13 (A) is a partial view of a prior art wave spring formed from a modified sine curve.
Figure 13B:
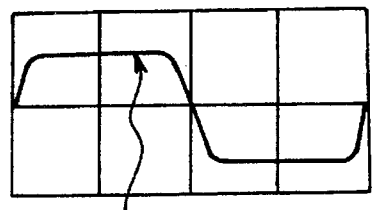

The formation of the wave spring 10 from a clothoid curve ensures that the radius of curvature ρ changes in inverse proportion to the length of the curve CLO. A spring structure having significant linearity is obtained. In the wave spring 10 according to the present invention, since the radius of curvature of the curve CLO continuously changes with the magnitude of the load to be imposed, the linearity of the curve CLO is improved to a great degree as compared with wave springs formed from the modified sine curve and modified trapezoidal curve shown in FIG. 13. As a result, in designing the wave spring 10, there is almost no possibility of occurrence of a difference between design and actually measured values, and significant effects are also obtained in respect of decreases in the number of manufacturing steps and in the number of wave springs produced on a trial manufacture basis.

Further, if it is necessary to add flat parallel portions 7 to the opposed ends of the troughs 3, continuity is retained between the parallel portions 7 and the curve portion CLO by connecting the parallel portions 7 to he terminal ends of the clothoid curves such that they are tangential thereto; Thus, bucking due to concentrated loading hardly occurs. Further, since a spring characteristic is obtained which can be practically regarded as a linear one approximate to that of the linear type wave spring 10 formed solely from a clothoid CLO, the size and specification of the wave spring 10 can be changed according to its uses despite the present of the parallel portions 7.

What is claimed is:

1. A wave spring comprising a plurality of circumferential spring elements each of which comprises a wave shape having ridge and root sections;

wherein said ridge and root sections of adjacent vertical spring elements are positioned opposite each other;

and wherein said spring elements comprise continuously formed wave portions of substantially flat cross section having said ridge and root sections; said ridge and root sections having the shape of a section of a clothoid curve; and wherein the relation between a load imposed on said wave spring and a deflection produced in said wave spring by the imposition of said load is substantially linear.

2. A wave spring comprising a plurality of wave shaped spring elements each having a portion in the form of a clothoid curve and a portion in flat developed form, wherein said flat portions are tangentially connected to a terminal end of said clothoid curve portions and wherein said flat portions of said spring elements are substantially parallel to each other.

* * * * *